(12) United States Patent
Arenas et al.

(10) Patent No.: US 11,682,795 B2
(45) Date of Patent: Jun. 20, 2023

(54) LEAD ACID BATTERY SEPARATOR AND LEAD ACID BATTERY

(71) Applicant: CPS Technology Holdings LLC, New York, NY (US)

(72) Inventors: Eduardo J. Arenas, Monterrey (MX); James S. Symanski, Greenfield, WI (US); Angelo John Tsagalis, Elm Grove, WI (US); Yinghao Yu, Brookfield, WI (US)

(73) Assignee: CPS Technology Holdings LLC, New York, NY (US)

( * ) Notice: Subject to any disclaimer, the term of this patent is extended or adjusted under 35 U.S.C. 154(b) by 122 days.

(21) Appl. No.: 16/966,400

(22) PCT Filed: Feb. 1, 2019

(86) PCT No.: PCT/US2019/016397
§ 371 (c)(1),
(2) Date: Jul. 30, 2020

(87) PCT Pub. No.: WO2019/152872
PCT Pub. Date: Aug. 8, 2019

(65) Prior Publication Data
US 2020/0365947 A1 Nov. 19, 2020

Related U.S. Application Data (60) Provisional application No. 62/625,776, filed on Feb. 2, 2018.

(51) Int. Cl.
*H01M 50/466* (2021.01)
*H01M 10/12* (2006.01)
*H01M 4/14* (2006.01)

(52) U.S. Cl.
CPC ............. *H01M 10/12* (2013.01); *H01M 4/14* (2013.01); *H01M 50/466* (2021.01); *H01M 2220/20* (2013.01)

(58) Field of Classification Search
CPC ............. H01M 50/463; H01M 50/489; H01M 50/466; H01M 50/40; H01M 50/449
See application file for complete search history.

(56) References Cited

U.S. PATENT DOCUMENTS 3,862,862 A * 1/1975 Gillibrand ............... H01M 4/14
427/314
4,026,000 A * 5/1977 Anderson ............. B29C 65/086
156/484

(Continued)

FOREIGN PATENT DOCUMENTS

WO 2017/027037 A1 2/2017

OTHER PUBLICATIONS

International Search Report and Written Opinion of the International Searching Authority dated May 9, 2019 for Intl. Appln. PCT/US2019/016397, 11 pgs.

*Primary Examiner* — Imran Akram
(74) *Attorney, Agent, or Firm* — Boardman & Clark LLP (57) ABSTRACT

A separator for a battery is disclosed. The separator is an envelope separator. At least one aperture is provided in any of the first sealed edge, second sealed edge, and third sealed edge of the envelope separator, wherein the at least one aperture forms an electrolyte conduit which assists in the reduction of acid stratification. A battery and a plate and separator assembly are also disclosed.

20 Claims, 11 Drawing Sheets

(56) References Cited

U.S. PATENT DOCUMENTS

| | | | | |
|---|---|---|---|---|
| 4,037,030 | A | * | 7/1977 | Sabatino ........... H01M 10/0413 |
| | | | | 429/139 |
| 4,074,021 | A | * | 2/1978 | Aronson ............... H01M 50/77 |
| | | | | 429/51 |
| 5,470,676 | A | * | 11/1995 | Nakano ............... H01M 50/451 |
| | | | | 429/225 |
| 5,558,952 | A | * | 9/1996 | Knauer ............... H01M 50/466 |
| | | | | 429/143 |
| 5,716,734 | A | * | 2/1998 | Nakano ............... H01M 50/466 |
| | | | | 429/143 |
| 9,379,378 | B2 | | 6/2016 | Ross et al. |
| 2002/0031698 | A1 | * | 3/2002 | Inoue .................. H01M 8/0271 |
| | | | | 429/481 |
| 2003/0049525 | A1 | * | 3/2003 | Hottori ............... H01M 50/437 |
| | | | | 429/140 |
| 2009/0136834 | A1 | * | 5/2009 | Coowar ............ H01M 10/0583 |
| | | | | 29/623.2 |
| 2011/0003190 | A1 | * | 1/2011 | Whear .................. H01M 50/44 |
| | | | | 264/319 |
| 2013/0029203 | A1 | * | 1/2013 | Ross ....................... H01M 4/14 |
| | | | | 429/211 |
| 2015/0162589 | A1 | * | 6/2015 | Kesper ............... H01M 50/403 |
| | | | | 429/139 |
| 2017/0047615 | A1 | | 2/2017 | Mittal et al. |
| 2018/0205120 | A1 | * | 7/2018 | Ahn ...................... H01M 10/38 |

* cited by examiner

LEAD ACID BATTERY SEPARATOR AND LEAD ACID BATTERY

CROSS-REFERENCE TO RELATED APPLICATIONS

The present application is a United States National Stage Entry of Application Serial No. PCT/US2019/016397, filed Feb. 1, 2019, which claims priority to U.S. Provisional Patent Application, Ser. No. 62/625,776 filed Feb. 2, 2018, entitled BATTERY SEPARATOR, the entire contents of each of which is hereby incorporated by reference herein in its entirety.

FIELD

The present inventions relate to the field of batteries (e.g. lead-acid batteries including batteries for vehicle starting, lighting and ignition applications; marine batteries; commercial batteries; industrial batteries; batteries for use with hybrid-electric vehicles, micro-hybrid vehicles, etc.). The present inventions more specifically relate to the internal configuration of a lead acid battery and separators used therewith.

BACKGROUND

Lead-acid storage batteries are typically formed of several cell elements which are encased in separate compartments of a container with sulfuric acid electrolyte. Each cell element typically includes at least one positive plate, at least one negative plate, and a separator positioned between each positive and negative plate. The positive and negative plates are generally a lead or lead alloy grid that supports an electrochemically active material, and in particular a lead based material (i.e., PbO, $PbO_2$, Pb or $PbSO_4$) pasted onto the grid. The grids provide an electrical contact between the positive and negative active materials which serve to conduct current.

Different types of separators are known and used in lead-acid batteries, some examples of which include, but are not limited to leaf separators and envelope separators. Unfortunately, many of these known separators have drawbacks.

In some batteries it is desirable to have more acid flow on the battery plate or circulation of acid or electrolyte to avoid acid stratification. The type of separator chosen may impact the amount of acid flow on the battery plate. For example, a leaf separator which is interposed between leaf separators allows more flow of acid as compared to an envelope separator which is sealed on three sides. On the other hand, an envelope separator retains more active material in the separator.

While an envelope-type separator may allow for more active material to be retained in the separator and near the grid, this configuration historically has had certain downsides to performance and longevity of the battery over time. Envelope separators provide the benefit of reducing the propensity for "mossing shorts" because the enveloped positive plate retains the shed active material that leads to "mossing"; thereby, reducing the probability of early battery failure. However, envelope separators reduce the ability of the electrolyte to circulate, and some batteries having an enveloped separator can fail due to acid/electrolyte stratification or require substantial overcharge to overcome electrolyte stratification and maintain acceptable cycle life and field life.

Batteries with separators that are interleaved between plates rather than enveloped around the plates may be subject to problems of longevity and performance (due to the formation of dendrites, for instance). For example, such batteries with leaf separators are vulnerable to failure do to mossing shorts. On the other hand, leaf separators in certain batteries do not require as much overcharge to maintain the same cycle life and field life as a battery having envelope separators; thereby, lowering the energy cost to the battery owner.

In addition, typical battery designs are based upon a manufacturing footprint established to produce batteries. Equipment may be designed to produce battery elements that include either enveloping plates with separators or by interposing leaf separators into plate stacks, i.e., between electrodes.

Therefore, a need exists for a battery separator with the benefits of both an envelope separator and a leaf separator without the associated drawbacks. A need also exists for such a separator which can be introduced into a single manufacturing process.

SUMMARY

Accordingly, a battery plate assembly for a lead-acid battery is provided. The assembly includes a number of grids of a first polarity and a number of grids of a second polarity, each having a grid body, the grid body having an active material provided thereon. A separator envelopes at least a portion of the plate of a first polarity and extends to opposing plate faces.

An alternative battery plate assembly is also provided. The assembly includes a plurality of plates of a first polarity and a plurality of plates of a second polarity, each plate having a grid and a grid body. The grid body may have an active material provided thereon. A plurality of separators are also provided. Each separator of the plurality of separators envelopes at least a portion of each plate in the plurality of plates of a first polarity such that the separator material is interleaved between adjacent plates.

In various embodiments, the separator disclosed herein may be an envelope separator. The separator may have one or more apertures located along the periphery of the envelope separator.

Accordingly, a separator for a battery is disclosed. The separator comprises a first separator segment having a first edge, a second edge, a third edge, and a fourth edge; a second separator segment having a first edge, a second edge, a third edge, and a fourth edge. The second separator segment is sealed or joined to the first separator segment along the first edge of the first separator segment and the first edge of the second separator segment thereby forming a first sealed edge, the second edge of the first separator segment and the second edge of the second separator segment thereby forming a second sealed edge, and the third edge of the first separator segment and the third edge of the second separator segment thereby forming a third sealed edge. At least one aperture is provided in any of the first sealed edge, second sealed edge, and third sealed edge, wherein the at least one aperture forms an electrolyte conduit which assists in the reduction of acid stratification.

A battery is also disclosed. The battery has a battery housing. The battery housing has a cell compartment. A battery cell is received within the cell compartment. The battery cell has a plurality of battery plates, each plate comprising a grid and an active material thereon. An envelope separator surrounds a plate from the plurality of battery plates. The envelope separator has an aperture on a sealed or joined edge of the envelope separator. Electrolyte is provided in the battery housing. The aperture on the sealed edge of the envelope separator forms an electrolyte conduit which assists in the reduction of acid stratification.

A plate and separator assembly for a lead-acid battery is also disclosed. The assembly comprises a battery plate having a grid and active material thereon. An envelope separator surrounds the battery plate. The envelope separator has at least one aperture forming an electrolyte conduit which assists in the reduction of acid stratification.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following Figures, wherein.

It should be understood that the drawings are not necessarily to scale. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the particular embodiments illustrated herein.

DETAILED DESCRIPTION

A battery, a battery having a separator, and a separator and plate assembly for a battery are disclosed herein. The disclosed battery 100, according to one or more examples of embodiments, may be provided in a vehicle, which may comprise any variety or type of vehicle including, among others, commercial trucks, motorcycles, buses, recreational vehicles, boats, golf cars and carts, lawn and garden vehicles, and the like. The battery 100 may be configured to provide at least a portion of the power required to start or operate the vehicle and/or various vehicle systems (e.g., starting, lighting and ignition systems). The battery 100 may also be used, for example, in high performance engine starting, power sports, deep cycle, solar, storage, and the like. It should be understood that the battery 100 may be utilized in a variety of applications not involving a vehicle, and all such applications are intended to be within the scope of the present disclosure.

The battery 100 may include any type of secondary battery (e.g., rechargeable battery). According to one or more examples of embodiments, the battery 100 is a lead-acid storage battery. Lead-acid storage batteries may be either sealed (e.g., non-maintenance) or unsealed (e.g., wet). According to one or more examples of embodiments, the lead-acid storage battery 100 described herein is an unsealed lead-acid battery, although the principles discussed and applied may be adapted to other batteries.

Figure 1:
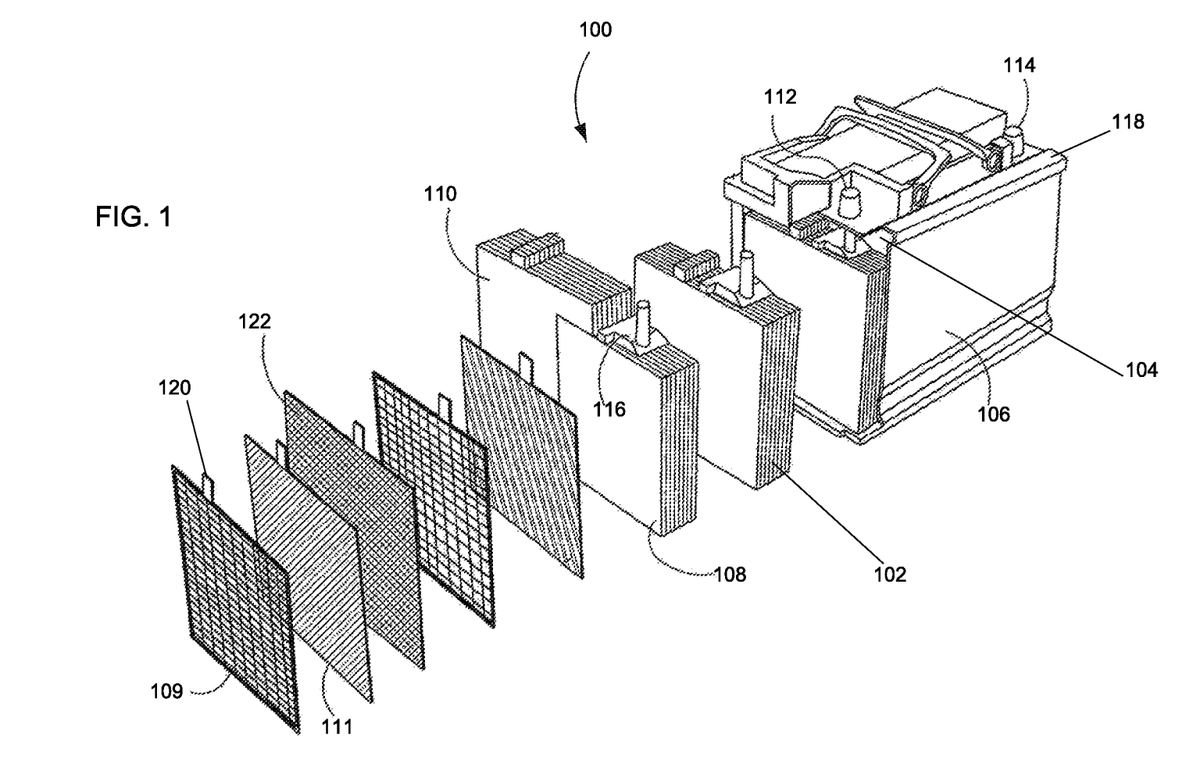
FIG. 1 is a partially exploded perspective view of a battery, according to one or more examples of embodiments.

An example of a lead-acid storage battery 100 is illustrated in the Figures. Referring to FIG. 1, the lead-acid storage battery 100 includes several cells 102 which are provided in separate compartments 104 of a container or housing 106 containing electrolyte. The illustrations provided herein may, in some instances, relate to applications wherein groups of plates are used in each of six stacks or cells 102 for producing a standard 12-volt battery. As shown in the illustrated example of FIGS. 1-2, a plurality of plates (positive 108 and negative 110) may be provided in a group or stack or cell 102.

The battery housing 106 may include a box-like base or container. The container or housing 106 may be formed of four side walls and a bottom wall. The battery compartment 104 also may be formed of a front wall, end walls, a rear wall and a bottom wall. A cover 118 may be secured to the housing 106, enclosing the compartment(s) 104, cells 102, and electrolyte within the housing 106. Terminals (positive 112 and negative 114) are electrically coupled to the battery cell(s) 102 through intercell connectors or straps 116 and may extend from the housing 106 or cover 118. In the example described herein, five cell partitions or dividers may be provided in a spaced apart location between the side walls of the housing 106, resulting in the formation of six cell compartments 104, as may be present in a 12-volt battery (not shown). A plurality of plate groups or stacks or cells 102 are connected in series according to the capacity of the lead storage battery 100 and are accommodated in the battery container or housing 106 together with the electrolyte, which is most commonly aqueous sulfuric acid. In various embodiments, a cell 102 or plate stack is located in each compartment 104. Each plate stack includes one or more positive plates 108 and one or more negative plates 110, each having at least one lug 120. Separator material 122 may be present between each positive plate 108 and negative plate 110.

Figure 2:
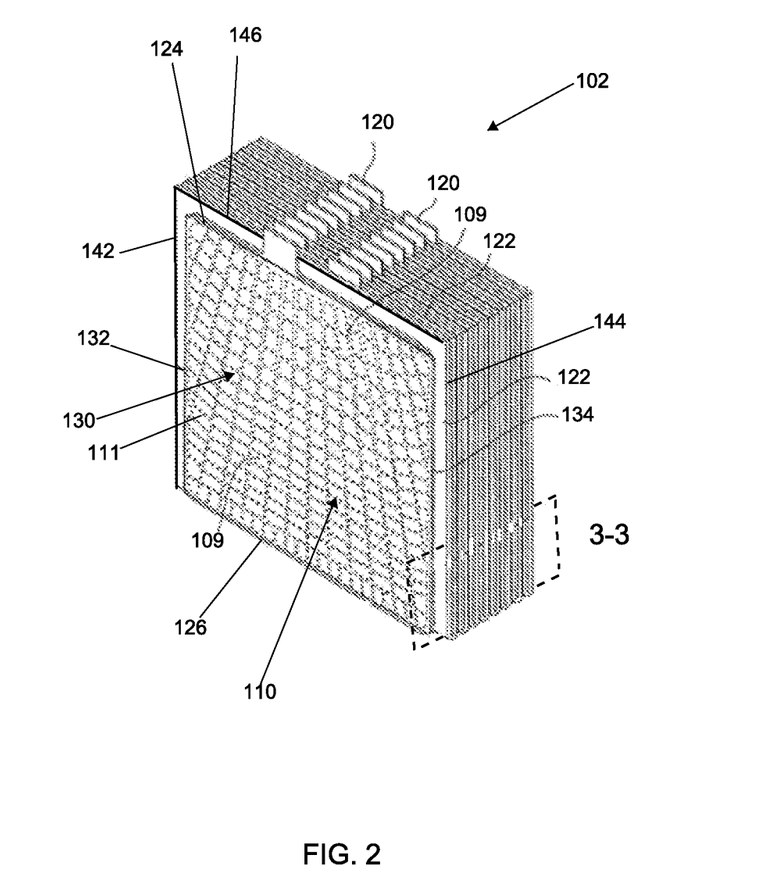
FIG. 2 is a perspective view of a battery cell having a number of plates stacked with a separator according to one or more examples of embodiments.
Figure 3:
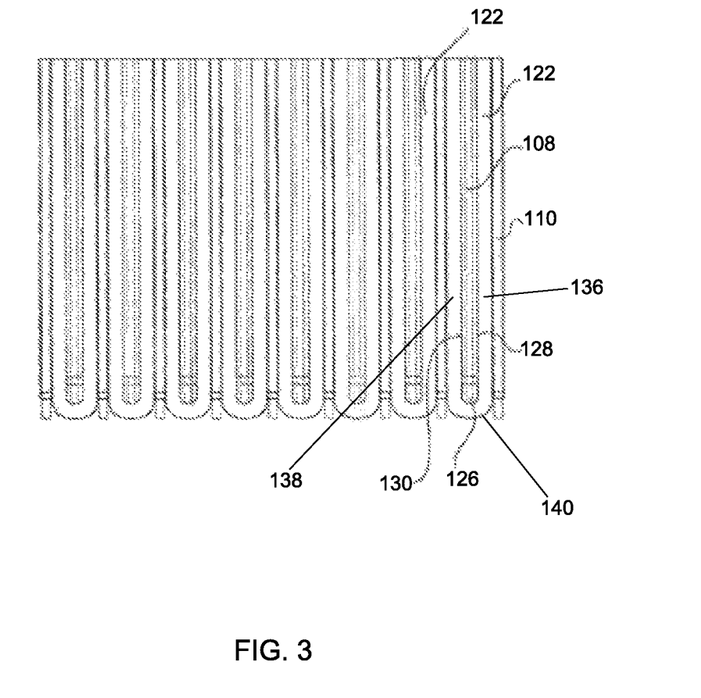
FIG. 3 is a detail, cross-sectional view of the battery cell of FIG. 2 taken along the line 3-3 of FIG. 2, showing a plurality of separators surrounding a plurality of battery plates.
Figure 4:
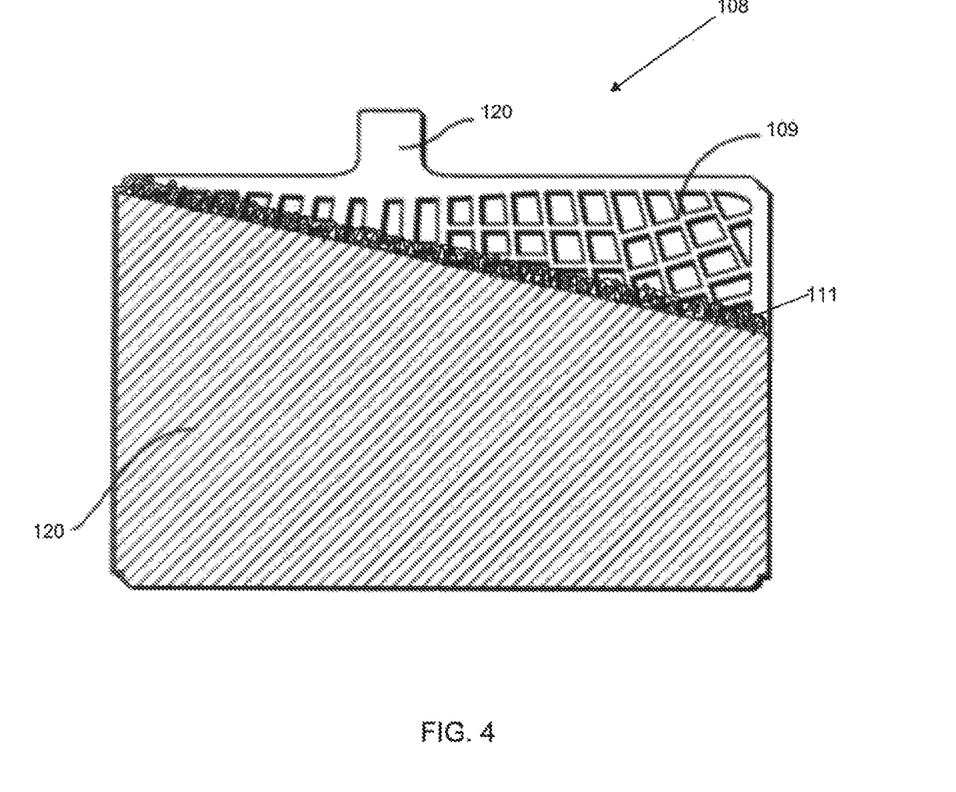
FIG. 4 is a cutaway elevation view of a separator described herein provided on a plate according to one or more examples of embodiments, and showing the plate partially covered by active material to reveal the grid.
Figure 5:
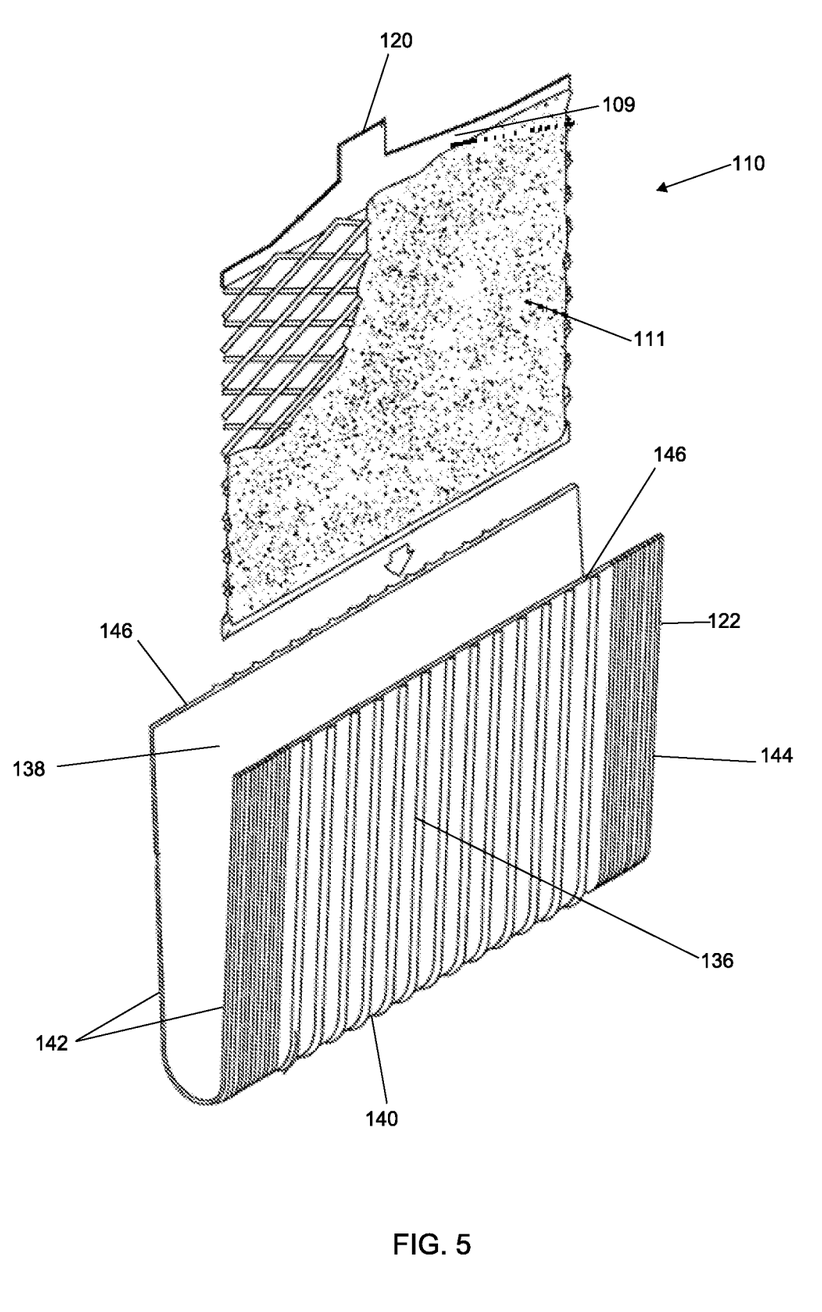
FIG. 5 is a partially exploded perspective view of a plate, namely a battery grid provided with active material shown partially cut away, and separator according to one or more examples of embodiments.

As illustrated in FIGS. 1-3, a number of plates 108, 110 may be provided with a separator 122 between each plate. The separator 122 may be placed on the plate 108 or 110, surrounding the plate 108 or 110, and/or between the plates 108, 110 to prevent shorting and/or undesirable electron flow produced during the reaction occurring in the battery 100. In one or more examples of embodiments, the separator 122 material may be wrapped under and/or around certain plates 108 or 110 (e.g. plates of a similar polarity). In some examples of embodiments separator material 122 is wrapped or partially wrapped around the positive plate(s) 108 or a portion thereof (see FIG. 4), although in other examples of embodiments the separator 122 may be wrapped or partially wrapped around the negative plate(s) 110 or a portion thereof (see FIG. 5).

Referring to FIGS. 4-8, in one or more examples of embodiments, the separator 122 material surrounds all sides of the plate 108 or 110, including the side edges like a pocket or envelope. Accordingly, the separator 122 is an envelope separator. In other words, a plate 108 or 110 having a top or top edge 124, bottom or bottom edge 126, front surface 128, back surface 130, first side edge 132 and second side edge 134 may have a separator 122 on or surrounding each edge and surface except, in some examples of embodiments the top 124 and in other examples of embodiments the lug 120. To this end, it is understood that the separator 122 may also cover the top edge 124, though the lug 120 protrudes beyond the separator 122. In one or more examples of embodiments, the separator 122 may cover the plate 108 or 110 allowing active material to stay adhered to or close to the grid. In this regard, the envelope separator 122 is formed by a first segment 136 and a second segment 138 which are joined together. More specifically, the first segment 136 and the second segment 138 may be secured together and may be sealed or substantially sealed along at least one, and in various examples of embodiments more than one, and in particular, three sides 140, 142, 144 on or along the outer periphery of the separator 122. In some examples of embodiments, the separator 122 may be folded over such that first segment 136 and second segment 138 face each other, and are joined or sealed along the folded edge 140. The side edges 142, 144 may also be subsequently joined together or sealed. In other examples of embodiments, the separator 122 may comprise two separate segments 136, 138 which are joined together along one or more edges 140, 142, 144. Preferably, at least the top edges 146 of separator segments are not sealed together so as to form a pocket or envelope into which a grid or plate 108 or 110 may be placed.

Figure 6:
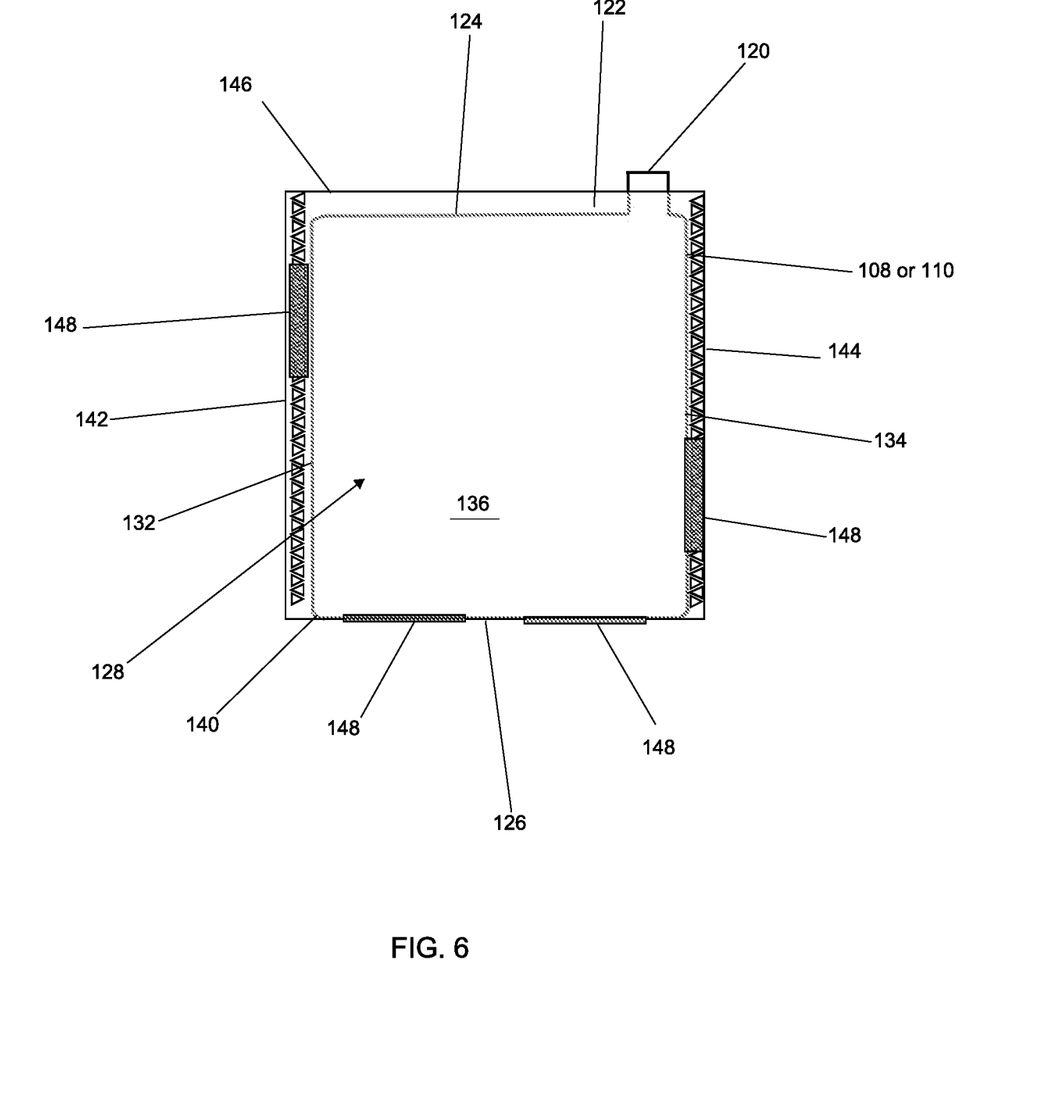
FIG. 6 is an elevation, partially transparent view of a separator according to one or more examples of embodiments, showing the separator provided on a plate and showing the separator having a plurality of apertures.
Figure 7:
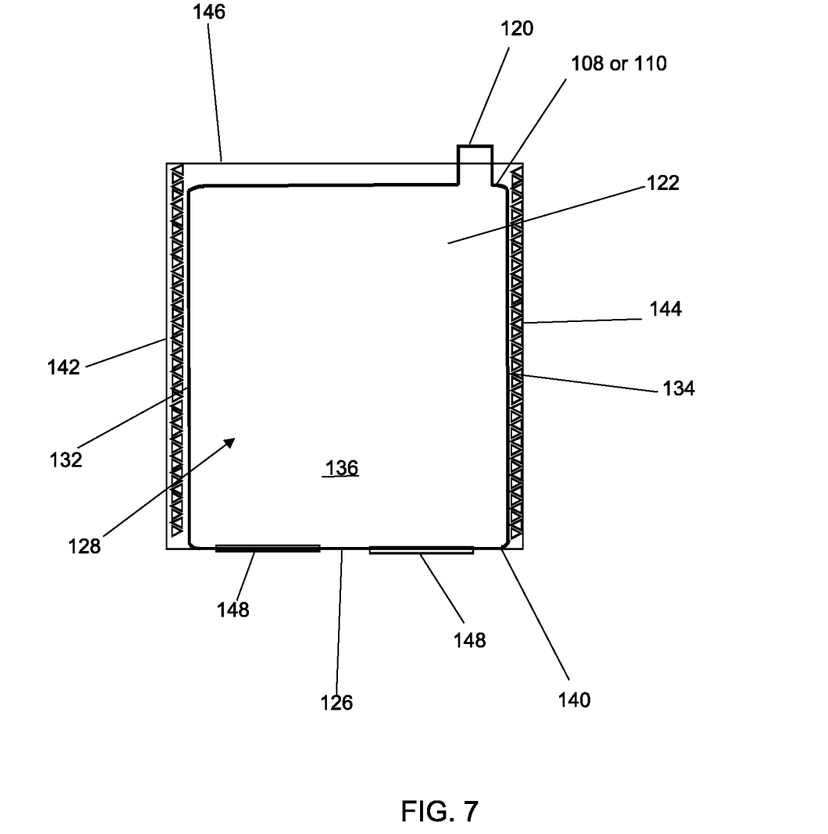
FIG. 7 is an elevation, partially transparent view of a separator according to one or more examples of embodiments, showing the separator provided on a plate and showing the separator having a plurality of apertures.
Figure 8:
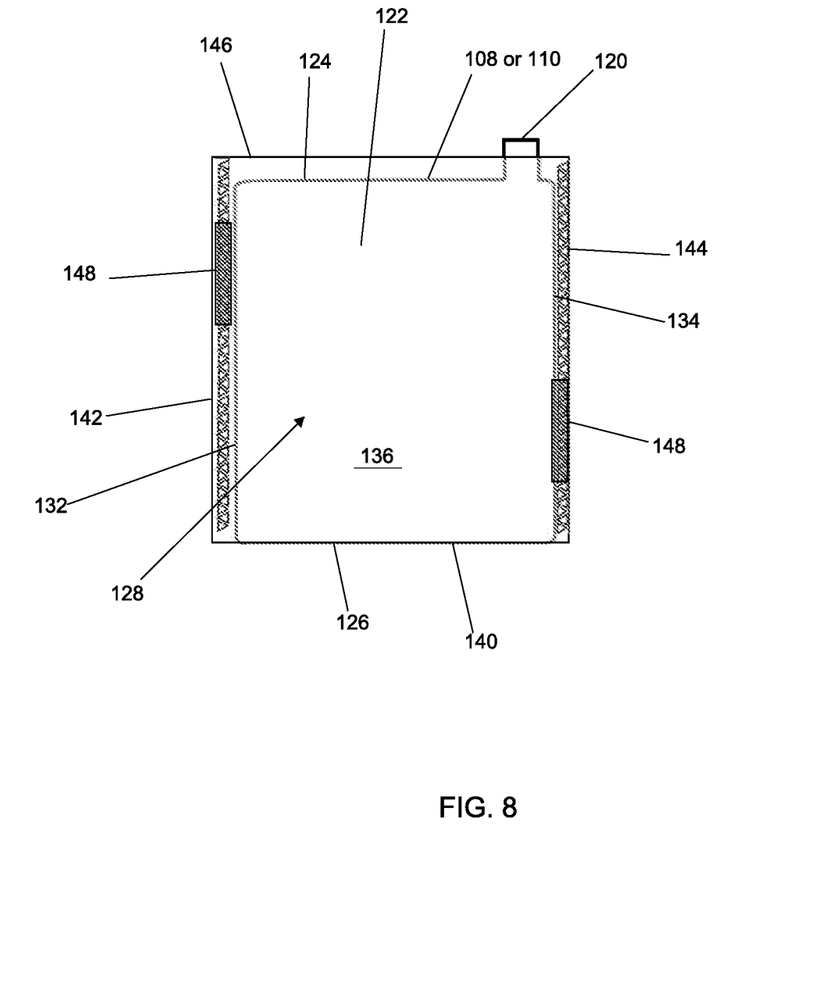
FIG. 8 is an elevation, partially transparent view of a separator according to one or more examples of embodiments, showing the separator provided on a plate and showing the separator having a plurality of apertures.

As indicated, the separator 122 may be an envelope separator, having a plate 108 or 110 therein. FIGS. 6-8 show a number of embodiments which seek to remedy the deficiencies of known envelope separators. Accordingly, the separator 122 may be substantially envelope-shaped, with one or more, and preferably three edges 140, 142, 144 finished (closed or sealed) and have an open top edge 146. According to one or more examples of embodiments, the separator 122 may be provided with at least one aperture 148 in an envelope separator edge, and in various examples of embodiments, one or more apertures 148 in the finished or joined/sealed edges 140, 142, and/or 144. For example, as shown in FIG. 6, the separator 122 may comprise four apertures 148, namely—an aperture 148 on each side edge 142, 144 of the separator 122, illustrated at differing distances from the top edge 146 of the separator 122, as well as two apertures 148 along a bottom edge 140. FIG. 7 shows an alternative example of embodiments, showing a separator 122 having two bottom edge 140 apertures 148. FIG. 8 shows an additional alternative example of embodiments. In FIG. 8, two apertures 148, one on each side edge 142, 144 are shown, each said aperture 148 being positioned a different distance from the top edge 146 or lug 120. In some examples of embodiments, the aperture(s) 148 on the side edge 142 or 144 may be spaced from an intersection with another edge 140 or 146 of the envelope separator 122 or aperture 148. In some additional examples of embodiments, the aperture(s) 148 on the bottom edge 140 may be spaced from another aperture 148 or edge 142, 144. It is also contemplated that the aperture 148 may be provided at a corner of the plate 108 or 110 or separator 122.

While specific examples are shown, one of skill in the art will appreciate that various positions and numbers of apertures 148 may be used to accomplish the purposes provided and the invention is not limited to the embodiments shown. Likewise, the apertures 148 may vary in width or size from those shown in the illustrated embodiments. Moreover, the apertures 148 may have varying width or be provided in a range of widths, depending on the size of the plate and/or separator, manufacturing parameters, desired functionality, and so forth. In one or more examples of embodiments, a range of apertures may be provided. As a non-limiting example, one or more apertures may be provided extending (in total) a range of approximately 15% to 75% of the separator edge, and in other examples of embodiments, may extend a range of 25% to approximately 50% of the separator edge. In another non-limiting example of embodiments, the total amount of aperture area on the separator edge (all sealed or joined edges combined) may range from approximately 15% to approximately 75% of the sealed or joined edge, and in other examples of embodiments may range from approximately 25% to approximately 50% of the sealed or joined separator edge. While particular configurations and positions are discussed herein, variations thereon should be contemplated as within the scope of this disclosure. For example, and as previously indicated, more or less apertures 148, longer or shorter lengths, etc. are all within the scope of this disclosure.

The apertures 148 in the separator 122 illustrated in FIGS. 6-8 may be understood to comprise a hole or cut in the separator material allowing for communication of electrolyte between the inside of the separator 122 envelope (i.e. adjacent the grid and active material) and the exterior of the separator 122 envelope and contents of the battery housing 106 and compartment 104. In this regard, electrolyte may, in various embodiments, flow into and out of the separator 122 through these limited aperture(s) 148. In various embodiments, the apertures 148 may comprise "vents." These vents form electrolyte conduits which aid or assist in reducing acid stratification. The aperture(s) 148 may be positioned to improve circulation of electrolyte and gasses within the battery 100 while maintaining active material next to the grid as a result of the enveloped shape of the separator 122.

One or more battery separators 122 are used to conductively separate the positive electrodes and negative electrodes. To this end, the separator material may be suitably insulative. The separator material may also comprise a composition which will not degrade in the acidic environment of the electrolyte. In various examples of embodiments, the separator material may be at least partially compressible so that upon stacking of the plates 108, 110, the separator material may at least partially conform to the contour of the surface of the plates. The separator 122 may be formed of polymer or glass or a combination thereof, and may be a woven or non-woven material structure. Various compositions are known, any one of which maybe suitable for the purposes of the present invention. The separator may be produced by known means adapted for the specific improvements described herein. In one or more examples of embodiments, an envelope separator is manufactured according to known means, but an additional step of cutting an aperture 148 or more than one aperture 148 is applied. In other examples of embodiments, known means of manufacturing leaf separators may be used. These leaf separators may be subsequently joined together, leaving openings or apertures at different locations of the joined edges or subsequently cut to form such apertures 148.

EXAMPLES

The following Examples are an illustration of one or more examples of embodiments of carrying out the invention and are not intended as to limit the scope of the invention.

Example

Deep cycle batteries typically may be charged in 3 steps: Constant Current charge, Constant Voltage charge or Topping charge, and Float charge. In Step 1 (Constant Current) the bulk of the battery's charge is provided. In Step 2 (Topping charge), lower charge current is delivered to provide charge saturation. Step 3 (Float charge) compensates for the loss caused by the inevitable self-discharge during the time the battery is not in use.

Charge Step 2 (Topping charge) is an important step for battery life performance. Step 2 assists in retaining battery capacity to accept full charge. In the event the battery does not receive a full charge the battery will suffer from sulfation.

Figure 9:
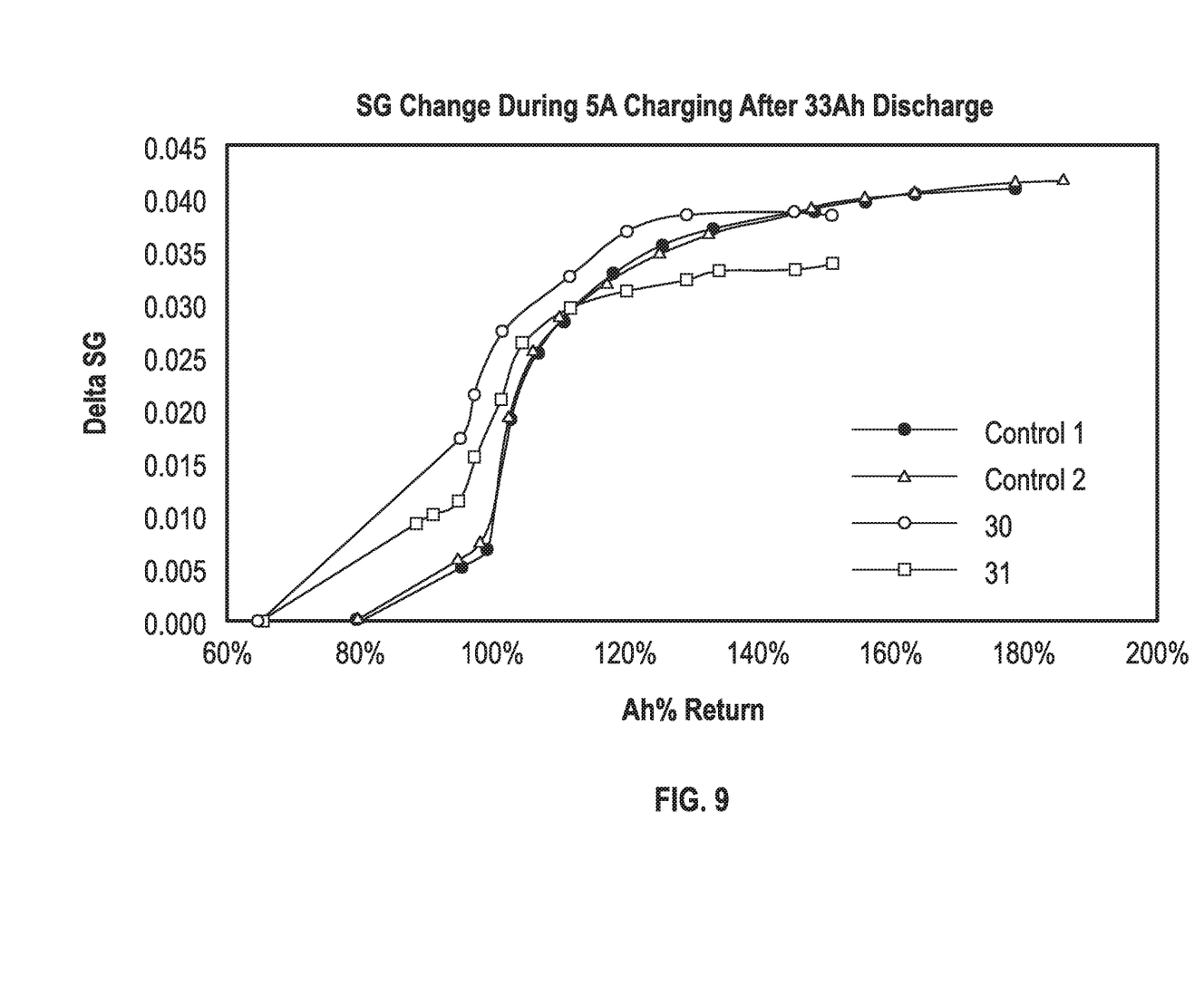
FIG. 9 is a graph showing the specific gravity change (SG) during 5 A (Amp) charging after 33 Ah (Amp hours) discharge of batteries having a separator according to one or more examples of embodiments against a control.
Figure 10:
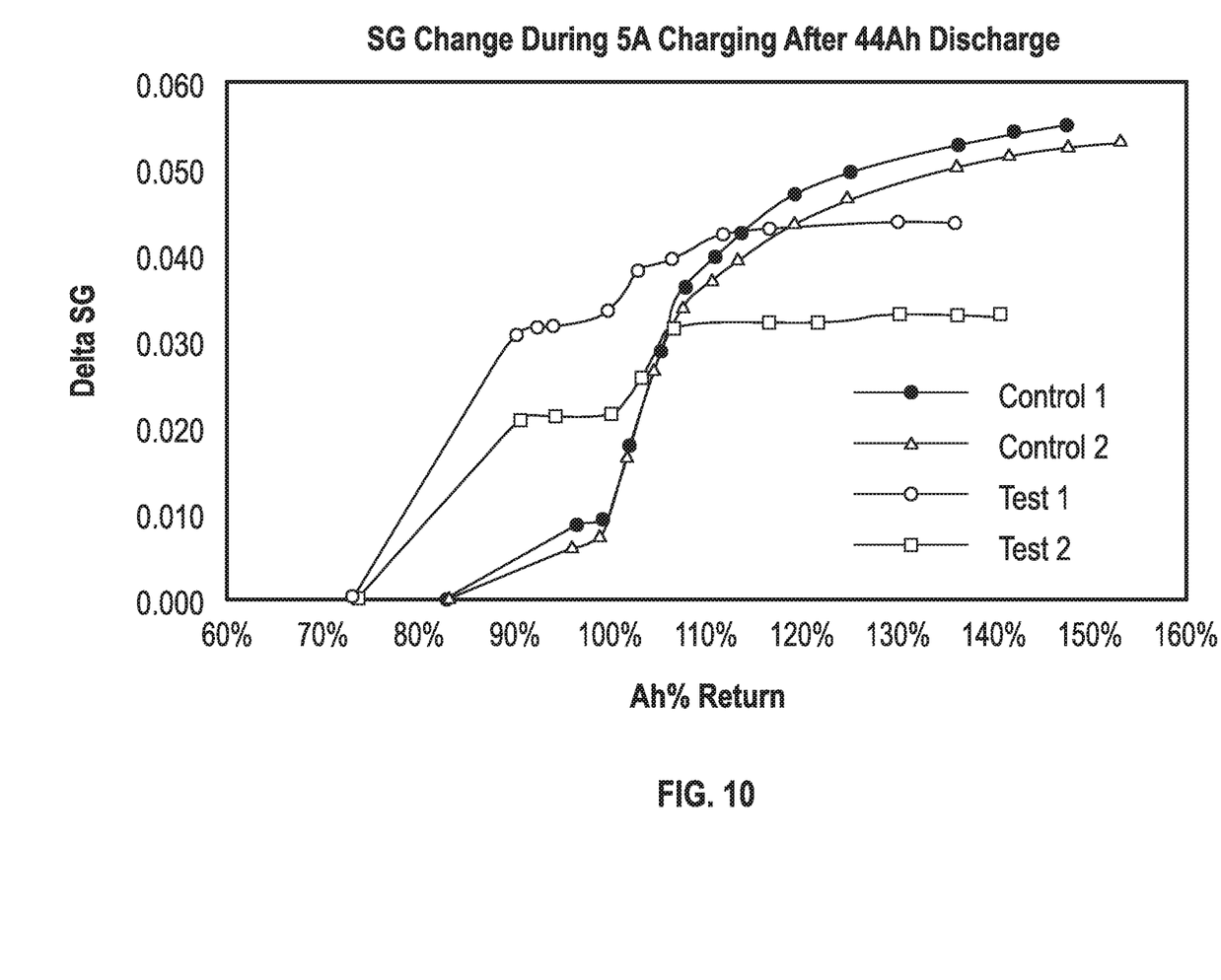
FIG. 10 is a graph showing the specific gravity change (SG) during 5 A (Amp) charging after 44 Ah (Amp hours) discharge of batteries having a separator according to one or more examples of embodiments against a control.
Figure 11:
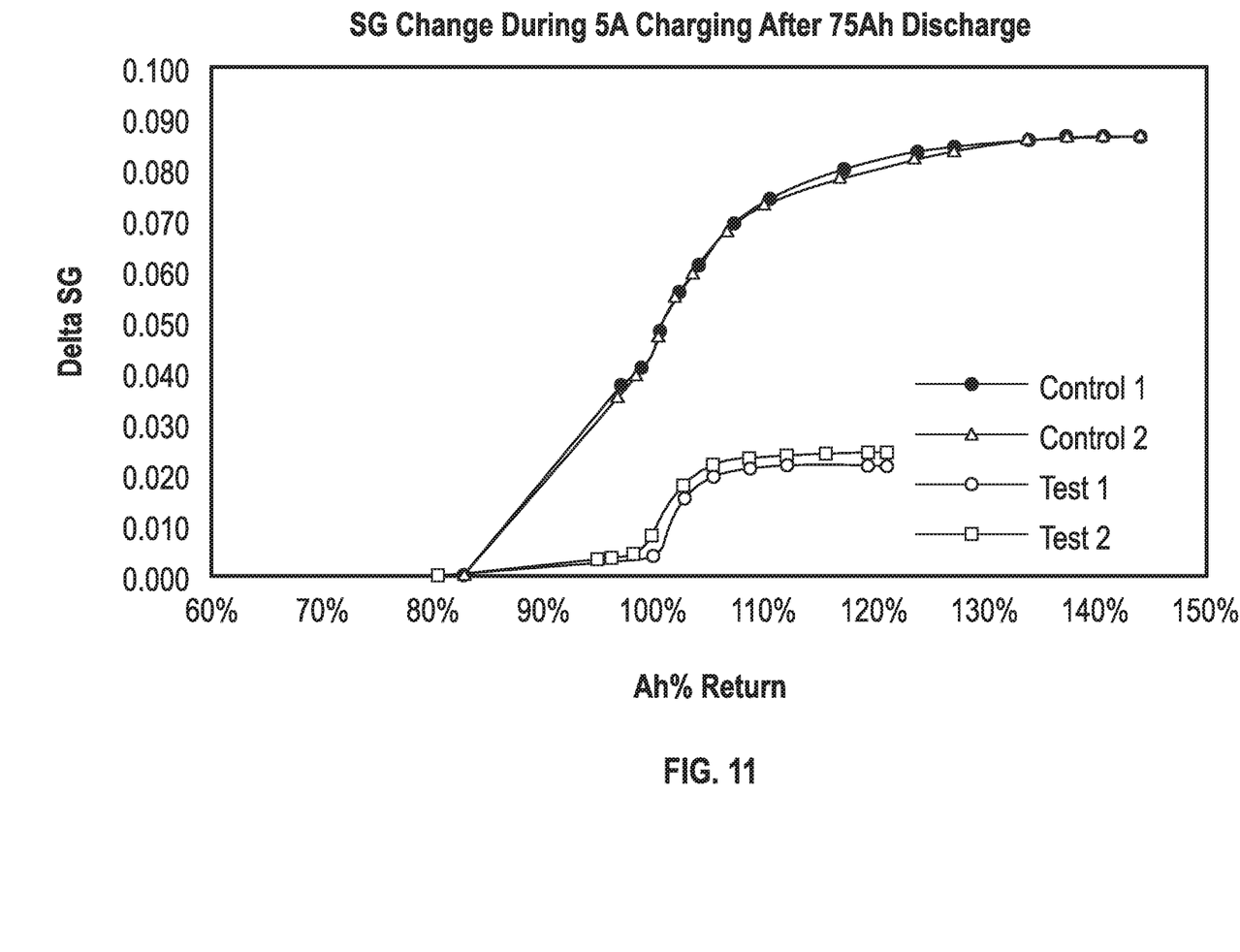
FIG. 11 is a graph showing the specific gravity change (SG) during 5 A (Amp) charging after 75 Ah (Amp hours) discharge of batteries having a separator according to one or more examples of embodiments against a control.

Various experiments were conducted on lead-acid batteries, measuring the specific gravity change (SG) during 5 A (Amp) charging after 33 Ah (Amp hours) discharge, 44 Ah discharge, and 75 Ah discharge, respectively. The results are shown in FIGS. 9-11. The experiments measured batteries including envelope separators of the type described herein against a control having a traditional envelope separator. Envelope separator batteries tested with the novel features described herein were provided with an increase in acid concentration on the battery plate surface, achieved by providing an opening or aperture in the separator at the bottom to reduce acid flow restriction on the plate surface.

FIGS. 9-11 illustrate that batteries assembled with a separator having an aperture or cut require less Amp(s) per hour to recharge or return back to an approximately full battery charge. As can be seen, the greater the Ah discharge the lower the change in specific gravity with the increase in Ah % return (compare FIG. 9 to FIGS. 10 & 11). The experiment demonstrates that an increase of the acid concentration in the plate surface, such as but not limited to the positive plate surface, increases the charging efficiency.

Accordingly, a separator 122 for a battery 100 is disclosed. The separator 122 comprises a first separator segment 136 having a first edge 140, a second edge 142, a third edge 144, and a fourth edge 146; a second separator segment 138 having a first edge 140, a second edge 142, a third edge 144, and a fourth edge 146. The second separator segment 138 is sealed or joined to the first separator segment 136 along the first edges 140 of the separator segments thereby forming a first sealed edge, the second edges 142 of the separator segments thereby forming a second sealed edge, and the third edges 144 of the separator segments thereby forming a third sealed edge. At least one aperture 148 is provided in any of the first sealed edge, second sealed edge, and third sealed edge, wherein the at least one aperture 148 forms an electrolyte conduit which assists in the reduction of acid stratification.

A battery 100 is also disclosed. The battery 100 has a battery housing 106. The battery housing 106 has a cell compartment 104. A battery cell 102 is received within the cell compartment 104. The battery cell 102 has a plurality of battery plates 108, 110, each plate 108, 110 comprising a grid 109 and an active material 111. An envelope separator 122 surrounds a plate 108 or 110 from the plurality of battery plates. The envelope separator 122 has an aperture 148 on a sealed or joined edge 140, 142, and/or 144 of the envelope separator. Electrolyte is provided in the battery housing 106. The aperture 148 on the sealed edge 140, 142, and/or 144 of the envelope separator 122 forms an electrolyte conduit which assists in the reduction of acid stratification.

A plate 108 or 110 and separator 122 assembly for a lead-acid battery 100 is also disclosed. The assembly comprises a battery plate 108 or 110 having a grid 109 and active material 111 thereon. An envelope separator 122 surrounds the battery plate 108 or 110. The envelope separator 122 has at least one aperture 148 forming an electrolyte conduit which assists in the reduction of acid stratification.

Various examples of aperture locations are shown and described below for purposes of illustration. The separator 122 according to one or more additional or alternative embodiments comprises a plurality of apertures 148, the plurality of apertures 148 being located in one of the first sealed edge 140, the second sealed edge 142, or the third sealed edge 144. In one example of embodiments, at least one first aperture 148 is located in at least one of the first sealed edge 140, the second sealed edge 142, or the third sealed edge 144, and at least one second aperture 148 is located in at least one of the first sealed edge 140, the second sealed edge 142, or the third sealed edge 144, but on a different sealed edge than the at least one first aperture 148. In another example of embodiments, two spaced apart apertures 148 are provided along the first sealed edge 140 of the separator 122, and in some examples of embodiments the two spaced apart apertures 148 may be spaced from the second sealed edge 142 and third sealed edge 144 of the envelope separator 122. It is understood that the locations of the apertures in these illustrative embodiments is for purposes of example only, and various alternatives may be acceptable for the purposes provided. As a non-limiting example, two spaced apart apertures 148 may be positioned along the second sealed edge 142 and/or the third sealed edge 144 rather than along the first sealed edge 140 as described above.

While the separator 122 is disclosed herein as having "edges" which may be sealed and have apertures 148 thereon, it is understood that the term "edge" is used to generally describe a peripheral region or area of the separator 122 and the location described in any one embodiment may be located in the general region rather on a precise edge. Likewise, the term "sealed" is used to generally describe a joined area between two components and any number of means to join two components may be suitable for the described purposes.

The envelope separator 122 described herein in one or more embodiments may allow for a higher concentration of fluid within the separator envelope (i.e. next to the grid) as compared to traditional envelope separators, while maintaining or improving charge efficiency. For example, as described hereinabove, known envelope separators may cause or contribute to acid stratification in the battery. This may diminish battery efficiency over time. The disclosed separator may help with efficient diffusion of acid, which is difficult in known envelope-type separators. The improved acid flow on the plate created by the addition of the one or more apertures, and thus electrolyte conduit(s), in the envelope separator assist in improving performance of the battery. That is, the disclosed separator may help avoid problems of acid stratification due to the improved circulation of electrolyte. The disclosed separator also provides advantages, such as, reduced overcharge requirements over known envelope separators and reduced risks for mossing shorts or dendrites from shedding material as seen in leaf separators. In other words, the disclosed separator reduces charging requirements and the probability of early failure. In addition, the separator described herein can be manufactured in a single manufacturing process adapted from either enveloping or leaf machines. Accordingly, the envelope separator described herein, including acid conduits provided therein, solve one or more of the technical problems associated with existing separators by providing, among other things, improved circulation of acid, a reduction in acid stratification, an improvement or increase in charge efficiency, and may be manufactured on a single piece of equipment. These and other features, advantages, and technical solutions, will be apparent from the foregoing description, figures, and claims.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A separator for a battery comprising:
   a first separator segment having a first edge, a second edge, a third edge, and a fourth edge;
   a second separator segment having a first edge, a second edge, a third edge, and a fourth edge, the second separator segment sealed to the first separator segment along the first edge of the first separator segment and the first edge of the second separator segment thereby forming a first sealed edge, the second edge of the first separator segment and the second edge of the second separator segment thereby forming a second sealed edge, and the third edge of the first separator segment and the third edge of the second separator segment thereby forming a third sealed edge; and
   at least one aperture provided on at least one sealed corner, the at least one aperture comprising vents, the vents being an acid stratification reducer and forming an electrolyte transfer location.

2. The separator of claim 1, further comprising a plurality of apertures, the plurality of apertures in one of the first sealed edge, the second sealed edge, or the third sealed edge.

3. The separator of claim 1, wherein the at least one aperture comprises at least one first aperture being located in at least one of the first sealed edge, the second sealed edge, or the third sealed edge, and at least one second aperture being located in at least one of the first sealed edge, the second sealed edge, and the third sealed edge, but on a different sealed edge than the at least one first aperture.

4. The separator of claim 1, wherein the at least one aperture comprises two spaced apart apertures along at least one of the first sealed edge, the second sealed edge, and the third sealed edge.

5. The separator of claim 4, wherein the two spaced apart apertures of at, least one of the first sealed edge and the second sealed edge are spaced from the fourth edge and the third sealed edge.

6. A battery plate having the separator of claim 1 thereon.

7. A battery having the separator of claim 1 therein.

8. A battery comprising:
a battery housing, the battery housing having a cell compartment;
a battery cell received within the cell compartment, the battery cell having a plurality of battery plates, each plate of the plurality of battery plates comprising a grid and an active material;
an envelope separator surrounding a plate from the plurality of battery plates, the envelope separator having an aperture on a sealed corner of the envelope separator, with the sealed corner in intersection with a bottom edge of the enveloped separator;
electrolyte in the battery housing; and
the aperture comprises vents, the vents being an acid stratification reducer and an electrolyte transfer location.

9. The battery of claim 8, further comprising a plurality of apertures on a sealed edge of the envelope separator.

10. The battery of claim 9, wherein the envelope separator comprises a first sealed edge, a second sealed edge, and a third sealed edge having the battery plate contained within the envelope formed by the first sealed edge, the second sealed edge, and the third sealed edge, and further comprising the plurality of apertures, the plurality of apertures being located in any one or more of the first sealed edge, the second sealed edge, and the third sealed edge.

11. The battery of claim 10, wherein the plurality of apertures comprise at least one first aperture being located in at least one of the first sealed edge, the second sealed edge, and the third sealed edge, and at least one second aperture being located in at least one of the first sealed edge, the second sealed edge, and the third sealed edge, but on a different sealed edge than the at least one first aperture.

12. The battery of claim 11, wherein the first aperture and the second aperture are spaced from a fourth edge and the third sealed edge.

13. The battery of claim 8, wherein the aperture comprises two spaced apart apertures along the sealed corner.

14. A plate and separator assembly for a lead-acid battery comprising:
a battery plate comprising a grid and active material thereon, and
an envelope separator surrounding the battery plate, the envelope separator having at least one aperture on a sealed corner of the envelope separator, with the side edge in intersection with a bottom edge of the enveloped separator, with the at least one aperture being an acid stratification reducer comprising vents which form an electrolyte transfer location.

15. The assembly of claim 14, further comprising a plurality of apertures on a sealed edge of the envelope separator.

16. The assembly of claim 15, wherein the envelope separator comprises a first sealed edge, a second sealed edge, and a third sealed edge having the battery plate contained within the envelope formed by the first sealed edge, the second sealed edge, and the third sealed edge, and further comprising the plurality of apertures, the plurality of apertures being located in any one or more of the first sealed edge, the second sealed edge, and the third sealed edge.

17. The assembly of claim 16, wherein the plurality of apertures comprise at least one first aperture being located in at least one of the first sealed edge, the second sealed edge, and the third sealed edge, and at least one second aperture being located in at least one of the first sealed edge, the second sealed edge, and the third sealed edge, but on a different sealed edge than the at least one first aperture.

18. The assembly of claim 17, wherein the first aperture and the second aperture are spaced from a top edge and the third sealed edge.

19. The assembly of claim 14, wherein the at least one aperture comprises two spaced apart apertures along a sealed edge of the envelope separator.

20. A battery having the assembly of claim 14.

* * * * *

UNITED STATES PATENT AND TRADEMARK OFFICE
CERTIFICATE OF CORRECTION

| | | |
|---|---|---|
| PATENT NO. | : 11,682,795 B2 | |
| APPLICATION NO. | : 16/966400 | |
| DATED | : June 20, 2023 | |
| INVENTOR(S) | : Eduardo J. Arenas et al. | |

It is certified that error appears in the above-identified patent and that said Letters Patent is hereby corrected as shown below:

In the Claims

1. In Column 11, Line 6, in Claim 5, delete "at," and insert -- at --, therefor.

2. In Column 12, Lines 13-14, in Claim 14, delete "side edge in" and insert -- sealed corner in --, therefor.

Signed and Sealed this
Seventh Day of May, 2024

Katherine Kelly Vidal
*Director of the United States Patent and Trademark Office*